US011739020B2

(12) United States Patent
Bisson et al.

(10) Patent No.: US 11,739,020 B2
(45) Date of Patent: Aug. 29, 2023

(54) CONVEYING APPARATUS AND METHODS FOR CONVEYING RIBBON

(71) Applicant: Corning Incorporated, Corning, NY (US)

(72) Inventors: Antoine Gaston Denis Bisson, Painted Post, NY (US); Keith Raymond Gaylo, Lenoir City, TN (US); Jacob Immerman, Corning, NY (US); Rohit Rai, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/817,086

(22) Filed: Aug. 3, 2022

(65) Prior Publication Data

US 2022/0371937 A1 Nov. 24, 2022

Related U.S. Application Data

(62) Division of application No. 17/312,689, filed as application No. PCT/US2019/064201 on Dec. 3, 2019, now Pat. No. 11,440,831.
(Continued)

(51) Int. Cl.
*B65G 49/06* (2006.01)
*C03B 35/24* (2006.01)
*B65G 51/03* (2006.01)

(52) U.S. Cl.
CPC .......... *C03B 35/246* (2013.01); *B65G 49/065* (2013.01); *B65G 51/03* (2013.01); *B65G 2207/06* (2013.01)

(58) Field of Classification Search
None
See application file for complete search history.

(56) References Cited

U.S. PATENT DOCUMENTS 3,362,806 A * 1/1968 Brewin ................. C03B 25/087
65/25.2
3,375,093 A * 3/1968 Reising ................. C03B 23/035
414/676
(Continued)

FOREIGN PATENT DOCUMENTS

CN 101359166 B * 6/2011 ............... G03C 5/26
CN 104556666 A 4/2015
(Continued)

OTHER PUBLICATIONS

International Search Report and Written Opinion of the International Searching Authority; PCT/US19/64201; dated Mar. 19, 2020; 12 pages; Korean Intellectual Property Office.
(Continued)

*Primary Examiner* — Joseph A Dillon, Jr.
(74) *Attorney, Agent, or Firm* — Matthew J. Mason (57) ABSTRACT

A conveying apparatus can comprise one or more support members defining an interior passage and a first plurality of apertures. A first cross-sectional area of the interior passage at a first end portion of a support area can be greater than a second cross-sectional area of the interior passage at a second end portion of the support area. A tube can extend within the interior passage and comprises a second plurality of apertures. Methods are also provided for conveying a ribbon with one or more support members.

12 Claims, 4 Drawing Sheets

Related U.S. Application Data (60) Provisional application No. 62/778,982, filed on Dec. 13, 2018.

(56) References Cited

U.S. PATENT DOCUMENTS

| | | | |
|---|---|---|---|
| 3,477,839 A * | 11/1969 | Misson | C03B 23/035 |
| | | | 65/273 |
| 3,744,693 A * | 7/1973 | Greiner | B29C 48/355 |
| | | | 242/615.12 |
| 3,813,230 A * | 5/1974 | Doe | B24D 5/12 |
| | | | 51/297 |
| 3,999,696 A * | 12/1976 | Reba | D21G 9/0063 |
| | | | 226/7 |
| 4,106,757 A | 8/1978 | Jackson | |
| 4,378,988 A | 4/1983 | Presta | |
| 4,416,201 A * | 11/1983 | Kessler | B41K 3/60 |
| | | | 101/367 |
| 5,762,673 A * | 6/1998 | Hirota | C03B 11/08 |
| | | | 65/84 |
| 6,004,432 A | 12/1999 | Page et al. | |
| 6,125,754 A | 10/2000 | Harris | |
| 6,155,518 A | 12/2000 | Bannenberg | |
| 6,250,581 B1 * | 6/2001 | Cramer | B65H 18/20 |
| | | | 226/97.1 |
| 6,263,705 B1 | 7/2001 | Vild | |
| 6,295,842 B1 | 10/2001 | McMaster | |
| 6,315,501 B1 | 11/2001 | Yagai et al. | |
| 6,505,483 B1 | 1/2003 | Hoetzl et al. | |
| 6,736,588 B1 | 5/2004 | Baldwin et al. | |
| 7,025,303 B2 * | 4/2006 | Meyer | B29C 48/10 |
| | | | 242/615.4 |
| 7,096,691 B2 | 8/2006 | Nishitani et al. | |
| 7,311,234 B2 | 12/2007 | Solberg | |
| 7,383,772 B2 * | 6/2008 | Boppel | B65H 45/28 |
| | | | 226/97.1 |
| 7,428,959 B2 | 9/2008 | Jung et al. | |
| 7,654,427 B1 * | 2/2010 | Tsai | B65H 20/12 |
| | | | 242/615.11 |
| 7,914,239 B2 | 3/2011 | Van Huis | |
| 8,028,543 B2 | 10/2011 | Carlomagno | |
| 8,789,392 B2 | 7/2014 | Cleary et al. | |
| 9,199,816 B2 | 12/2015 | Blanding et al. | |
| 9,505,564 B2 | 11/2016 | Eisenstock et al. | |
| 9,790,121 B2 | 10/2017 | Abramov et al. | |
| 9,822,028 B2 | 11/2017 | Chang et al. | |
| 9,834,389 B2 | 12/2017 | Abramov et al. | |
| 9,878,934 B2 | 1/2018 | Shi et al. | |
| 9,919,381 B2 | 3/2018 | Abramov et al. | |
| 10,570,047 B2 * | 2/2020 | Aburada | C03B 33/091 |
| 10,870,601 B2 * | 12/2020 | Bayne | C03B 33/033 |
| 2003/0177790 A1 | 9/2003 | Langsdorf et al. | |
| 2004/0007019 A1 * | 1/2004 | Kohli | C03B 35/246 |
| | | | 65/144 |
| 2006/0150683 A1 * | 7/2006 | Lewandowski | C03B 35/18 |
| | | | 65/114 |
| 2009/0110809 A1 | 4/2009 | Buschbeck | |
| 2012/0213599 A1 | 8/2012 | Inazawa et al. | |
| 2013/0316142 A1 * | 11/2013 | Nuettgens | C03C 3/097 |
| | | | 65/25.2 |
| 2014/0053605 A1 | 2/2014 | Mader | |
| 2014/0221588 A1 | 8/2014 | Sarma et al. | |
| 2015/0096331 A1 | 4/2015 | Rantala et al. | |
| 2015/0274571 A1 | 10/2015 | Brennan et al. | |
| 2016/0243724 A1 | 8/2016 | Kitaguchi | |
| 2018/0104793 A1 | 4/2018 | Franke et al. | |
| 2018/0161954 A1 | 6/2018 | Bajaj et al. | |
| 2019/0256398 A1 | 8/2019 | Palmantier et al. | |
| 2020/0277216 A1 * | 9/2020 | Amadon | B65H 20/02 |
| 2020/0290916 A1 * | 9/2020 | Bisson | B65H 20/00 |
| 2022/0332626 A1 * | 10/2022 | Fournel | C03B 17/062 |

FOREIGN PATENT DOCUMENTS

| | | |
|---|---|---|
| CN | 107428589 A | 12/2017 |
| EP | 0041899 A1 | 12/1981 |
| EP | 0905095 A2 | 3/1999 |
| JP | 2014-525391 A | 9/2014 |
| JP | 2014-528509 A | 10/2014 |
| TW | 201736295 A | 10/2017 |
| WO | 2013/033063 A1 | 3/2013 |
| WO | 2013/164964 A1 | 11/2013 |
| WO | 2015/065793 A1 | 5/2015 |
| WO | 2016/123000 A1 | 8/2016 |
| WO | 2017/161104 A1 | 9/2017 |
| WO | 2019/089527 A1 | 5/2019 |

OTHER PUBLICATIONS

Chinese Patent Application No. 201980088389.0, Office Action dated Sep. 28, 2022, 5 pages (English Translation only), Chinese Patent Office.

* cited by examiner

CONVEYING APPARATUS AND METHODS FOR CONVEYING RIBBON

CROSS-REFERENCE TO RELATED APPLICATIONS

This application is a divisional application and claims the benefit of priority under 35 U.S.C. § 120 of U.S. application Ser. No. 17/312,689, filed on Jun. 10, 2021, which, in turn, claims the benefit of priority under 35 U.S.C. § 371 of International Patent Application Serial No. PCT/US2019/064201, filed on Dec. 3, 2019, which, in turn, claims the benefit of priority under 35 U.S.C. § 119 of U.S. Provisional Application Ser. No. 62/778,892, filed on Dec. 13, 2018, the contents of each are relied upon and incorporated herein by reference in their entireties.

FIELD

The present disclosure relates generally to conveying apparatus and methods and, more particularly, to conveying apparatus and methods for conveying ribbon.

BACKGROUND

It is known to horizontally convey a ribbon within a viscoelastic range with a plurality of rollers or static support bars. However, the rollers and static support bars may not be able to support the ribbon to maintain a substantially flat major surface of the ribbon while the ribbon cools to a glass ribbon in the elastic state. Consequently, undesirable features may be present in the resultant cooled glass ribbon that may have been avoided if the ribbon was maintained substantially flat during cooling. Still further, in some applications, there may be a desire to increase ribbon cooling during horizontal conveyance. However, the rollers or static support bars may not provide for cooling the ribbon at a desired cooling rate. Furthermore, use of rollers or static support bars may produce unwanted debris as the material of the rollers or static support bars deteriorate over time and requires frequent replacement of the rollers or static support bars and cleaning of the surrounding area.

It is also known to horizontally support ribbon with an air cushion positioned between the ribbon and a support to support a weight of the ribbon. However, such supports may not allow for quick escape of air within the central regions of the support, thereby causing a bulging effect in the ribbon as the gas accumulates in the gas cushion. The bulging effect frustrates the desire to maintain the ribbon with a substantially flat major surface during cooling into the glass ribbon. Furthermore, the accumulation of gas within the gas cushion may cause the average temperature of the gas cushion to increase, thereby interfering with efficient cooling of the ribbon by way of convective heat transfer. Furthermore, typical supports designed to produce an air cushion may not consider providing a consistent flow rate through the apertures along the support surface, thereby frustrating the purpose to maintain the substantially flat major surface during cooling into the glass ribbon.

SUMMARY

The following presents a simplified summary of the disclosure to provide a basic understanding of some embodiments described in the detailed description.

In some embodiments, a conveying apparatus can comprise one or more support members comprising an interior surface defining an interior passage and a plurality of apertures in fluid communication with the interior passage and extending through a support surface of the support member. Openings of the plurality of apertures at the support surface can define a support area of the support surface. The support area can comprise a length with a direction of the length extending along a flow path of the interior passage. The support area can further comprise a width extending in a direction perpendicular to the direction of the length. The length can be greater than the width. An inlet port can be positioned to direct a gas stream along the flow path of the interior passage. A first cross-sectional area of the interior passage along a first plane perpendicular to the direction of the length at a first end portion of the support area closest to the inlet port can be greater than a second cross-sectional area of the interior passage along a second plane perpendicular to the direction of the length at a second end portion of the support area farthest from the inlet port.

In some embodiments, cross-sectional areas of the interior passage along corresponding planes perpendicular to the direction of the length can sequentially decrease along the direction of the length from the first cross-sectional area to the second cross-sectional area.

In some embodiments, the cross-sectional areas can sequentially decrease at a constant rate.

In some embodiments, a first contour of the interior surface circumscribing the first cross-sectional area may be geometrically different than a second contour of the interior surface circumscribing the second cross-sectional area.

In some embodiments, the first contour can comprise a first trapezoidal shape and the second contour can comprise a second trapezoidal shape.

In some embodiments, the first trapezoidal shape can comprise a parallelogram and the second trapezoidal shape can comprise an acute trapezoid.

In some embodiments, a first contour of the interior surface circumscribing the first cross-sectional area can comprise a first trapezoidal shape and a second contour of the interior surface circumscribing the second cross-sectional area can comprise a second trapezoidal shape.

In some embodiments, the first trapezoidal shape can comprise a parallelogram and the second trapezoidal shape can comprise an acute trapezoid.

In some embodiments, a width of a segment of the interior surface along the direction of the width of the support area can be substantially the same along the length of the support area.

In some embodiments, the width of the support area can be from about 10 millimeters to about 100 millimeters.

In some embodiments, the support area can comprise a convex surface positioned radially about an axis extending along the direction of the length of the support area, and a contour of the convex surface along a plane perpendicular to the axis can extend along a radius in the plane perpendicular to the axis.

In some embodiments, the radius can be within a range of about 25 millimeters to about 500 millimeters.

In some embodiments, the contour of the convex surface can extend along an arc of a circle.

In some embodiments, the one or more support members can comprise a pair of adjacent support members comprising a first support member and a second support member. The support area of the first support member can be spaced from the support area of the second support member by a minimum distance of about 50 millimeters to about 500 millimeters.

In some embodiments, a conveying apparatus can comprise one or more support members comprising an interior surface defining an interior passage and a first plurality of apertures in fluid communication with the interior passage and extending through a support surface of the support member. Openings of the first plurality of apertures at the support surface can define a support area of the support surface, the support area can comprise a length and a direction of the length can extend along a flow path of the interior passage. The support area can further comprise a width extending in a direction perpendicular to the direction of the length. The length can be greater than the width. A tube can extend within the interior passage of the one or more support members. The tube can comprise a second plurality of apertures spaced along a flow direction of a flow path of the tube.

In some embodiments, a dimension of second plurality of apertures can sequentially decrease along the flow direction of the flow path of the tube.

In some embodiments, a spacing between adjacent apertures of the second plurality of apertures can sequentially increase along the flow direction of the flow path of the tube.

In some embodiments, the width of the support area can be from about 10 millimeters to about 100 millimeters.

In some embodiments, the support area can comprise a convex surface positioned radially about an axis extending along the direction of the length of the support area. A contour of the convex surface along a plane perpendicular to the axis can extend along a radius in the plane perpendicular to the axis.

In some embodiments, the radius can be within a range of about 25 millimeters to about 500 millimeters.

In some embodiments, the contour of the convex surface can extend along an arc of a circle.

In some embodiments, the one or more support members can comprise a pair of adjacent support members comprising a first support member and a second support member. The support area of the first support member cam be spaced from the support area of the second support member by a minimum distance of about 50 millimeters to about 500 millimeters.

In some embodiments, a conveying apparatus can comprise one or more support members comprising an interior surface defining an interior passage and a plurality of apertures in fluid communication with the interior passage and extending through a support surface of the support member. Openings of the plurality of apertures at the support surface can define a support area of the support surface. The support area can comprise a length with a direction of the length extending along a flow path of the interior passage. The support area can further comprise a width extending in a direction perpendicular to the direction of the length. The width of the support area can be from about 10 millimeters to about 100 millimeters. The length can be greater than the width. The support area can comprise a convex surface positioned radially about an axis extending along the direction of the length of the support area. A contour of the convex surface along a plane perpendicular to the axis can extend along a radius in the plane perpendicular to the axis within a range of about 25 millimeters to about 500 millimeters.

In some embodiments, the contour of the convex surface can extend along an arc of a circle.

In some embodiments, the one or more support members can comprise a pair of adjacent support members comprising a first support member and a second support member. The support area of the first support member can be spaced from the support area of the second support member by a minimum distance of about 50 millimeters to about 500 millimeters.

In some embodiments, methods can be provided for conveying a ribbon of material comprising a viscosity within a range of about $1 \times 10^6$ poise to about $1 \times 10^{10}$ poise with the conveying apparatus of any of the embodiments set forth above. The methods can comprise moving the ribbon of material comprising the viscosity within the range of about $1 \times 10^6$ poise to about $1 \times 10^{10}$ poise along a travel path in a path direction. The path direction may not be coincident with the direction of gravity. The path direction may extend across the direction of the length of each support area of the one or more support members. The methods can further comprise passing gas through the plurality of apertures from the interior passage of the one or more support members to provide a corresponding gas cushion between the moving ribbon of material and each support area of the one or more support members.

In some embodiments, the conveying apparatus can reduce the temperature of the moving ribbon of material by a total temperature reduction within a range of about 100° C. to about 150° C.

In some embodiments, a major surface of the moving ribbon of material supported by the one or more support members can comprise a flatness of 100 microns or less.

In some embodiments, the path direction can extend substantially perpendicular to the direction of the length of each support area of the one or more support members.

In some embodiments, the path direction can be substantially perpendicular to the direction of gravity.

In some embodiments, methods can be provided for conveying a ribbon of material comprising a viscosity within a range of about $1 \times 10^6$ poise to about $1 \times 10^{10}$ poise with one or more support members. Each support member of the one or more support members can comprise a support surface and an interior surface defining an interior passage and a first plurality of apertures in fluid communication with the interior passage and extending through the support surface. Openings of the first plurality of apertures at the support surface can define a support area of the support surface. The support area can comprise a length and a direction of the length can extend along a flow path of the interior passage The support area can further comprise a width extending in a direction perpendicular to the direction of the length and the length can be greater than the width. The methods can comprise moving the ribbon of material comprising the viscosity within the range of about $1 \times 10^6$ poise to about $1 \times 10^{10}$ poise along a travel path in a path direction. The path direction may not be coincident with the direction of gravity. The path direction can extend across the direction of the length of each support area of the one or more support members. The methods can further comprise passing gas through the first plurality of apertures from the interior passage of the one or more support members to provide a gas cushion between the moving ribbon of material and each support area of the one or more support members.

In some embodiments, the methods for conveying can reduce the temperature of the moving ribbon of material by a total temperature reduction within a range of about 100° C. to about 150° C.

In some embodiments, a major surface of the moving ribbon of material supported by the one or more support members can comprise a flatness of 100 microns or less.

In some embodiments, the path direction can extend substantially perpendicular to the direction of the length of each support area of the one or more support members.

In some embodiments, the path direction can be substantially perpendicular to the direction of gravity.

In some embodiments, the methods can further comprise directing a gas stream along the flow path of the interior passage of the one or more support members. A first cross-sectional area of the interior passage along a first plane perpendicular to the direction of the length at an upstream location of the flow path can be greater than a second cross-sectional area of the interior passage along a second plane perpendicular to the direction of the length at a downstream location of the flow path.

In some embodiments, cross-sectional areas of the interior passage along corresponding planes perpendicular to the direction of the length can sequentially decrease along the direction of the length from the first cross-sectional area to the second cross-sectional area.

In some embodiments, the cross-sectional areas can sequentially decrease at a constant rate.

In some embodiments, a first contour of the interior surface circumscribing the first cross-sectional area may be geometrically different than a second contour of the interior surface circumscribing the second cross-sectional area.

In some embodiments, the first contour can comprise a first trapezoidal shape and the second contour can comprise a second trapezoidal shape.

In some embodiments, the first trapezoidal shape can comprise a parallelogram and the second trapezoidal shape can comprise an acute trapezoid.

In some embodiments, a first contour of the interior surface circumscribing the first cross-sectional area can comprise a first trapezoidal shape and a second contour of the interior surface circumscribing the second cross-sectional area can comprise a second trapezoidal shape.

In some embodiments, the first trapezoidal shape can comprise a parallelogram and the second trapezoidal shape can comprise an acute trapezoid.

In some embodiments, a width of a segment of the interior surface along the direction of the width of the support area can be substantially the same along the length of the support area.

In some embodiments, the one or more support members can further comprise a tube extending within the interior passage of the one or more support members. The tube can comprise a second plurality of apertures spaced along a flow direction of a flow path of the tube. The gas can travel along the flow path of the tube and then pass through the second plurality of apertures into the interior passage of the one or more support members to then pass through the first plurality of apertures from the interior passage of the one or more support members.

In some embodiments, a dimension of second plurality of apertures can sequentially decrease along the flow direction of the flow path of the tube.

In some embodiments, a spacing between adjacent apertures of the second plurality of apertures can sequentially increase along the flow direction of the flow path of the tube.

In some embodiments, the width of the support area can be from about 10 millimeters to about 100 millimeters.

In some embodiments, the support area can comprise a convex surface positioned radially about an axis extending along the direction of the length of the support area. A contour of the convex surface along a plane perpendicular to the axis can extend along a radius in the plane perpendicular to the axis.

In some embodiments, the radius can be within a range of about 25 millimeters to about 500 millimeters.

In some embodiments, the contour of the convex surface can extend along an arc of a circle.

In some embodiments, the one or more support members can comprise a pair of adjacent support members comprising a first support member and a second support member. The support area of the first support member can be spaced from the support area of the second support member by a minimum distance of about 50 millimeters to about 500 millimeters.

In some embodiments, the width of the support area can be from about 10 millimeters to about 100 millimeters. The support area can comprise a convex surface positioned radially about an axis extending along the direction of the length of the support area. A contour of the convex surface along a plane perpendicular to the axis can extend along a radius in the plane perpendicular to the axis within a range of about 25 millimeters to about 500 millimeters.

In some embodiments, the contour of the convex surface can extend along an arc of a circle.

In some embodiments, the one or more support members can comprise a pair of adjacent support members comprising a first support member and a second support member. The support area of the first support member can be spaced from the support area of the second support member by a minimum distance of about 50 millimeters to about 500 millimeters.

Additional features and advantages of the embodiments disclosed herein will be set forth in the detailed description that follows, and in part will be clear to those skilled in the art from that description or recognized by practicing the embodiments described herein, including the detailed description which follows, the claims, as well as the appended drawings. It is to be understood that both the foregoing general description and the following detailed description present embodiments intended to provide an overview or framework for understanding the nature and character of the embodiments disclosed herein. The accompanying drawings are included to provide further understanding, and are incorporated into and constitute a part of this specification. The drawings illustrate various embodiments of the disclosure, and together with the description explain the principles and operations thereof.

BRIEF DESCRIPTION OF THE DRAWINGS

These and other features, aspects and advantages are better understood when the following detailed description is read with reference to the accompanying drawings, in which.

DETAILED DESCRIPTION

Embodiments will now be described more fully hereinafter with reference to the accompanying drawings in which example embodiments are shown. Whenever possible, the same reference numerals are used throughout the drawings to refer to the same or like parts. However, this disclosure may be embodied in many different forms and should not be construed as limited to the embodiments set forth herein.

Figure 1:
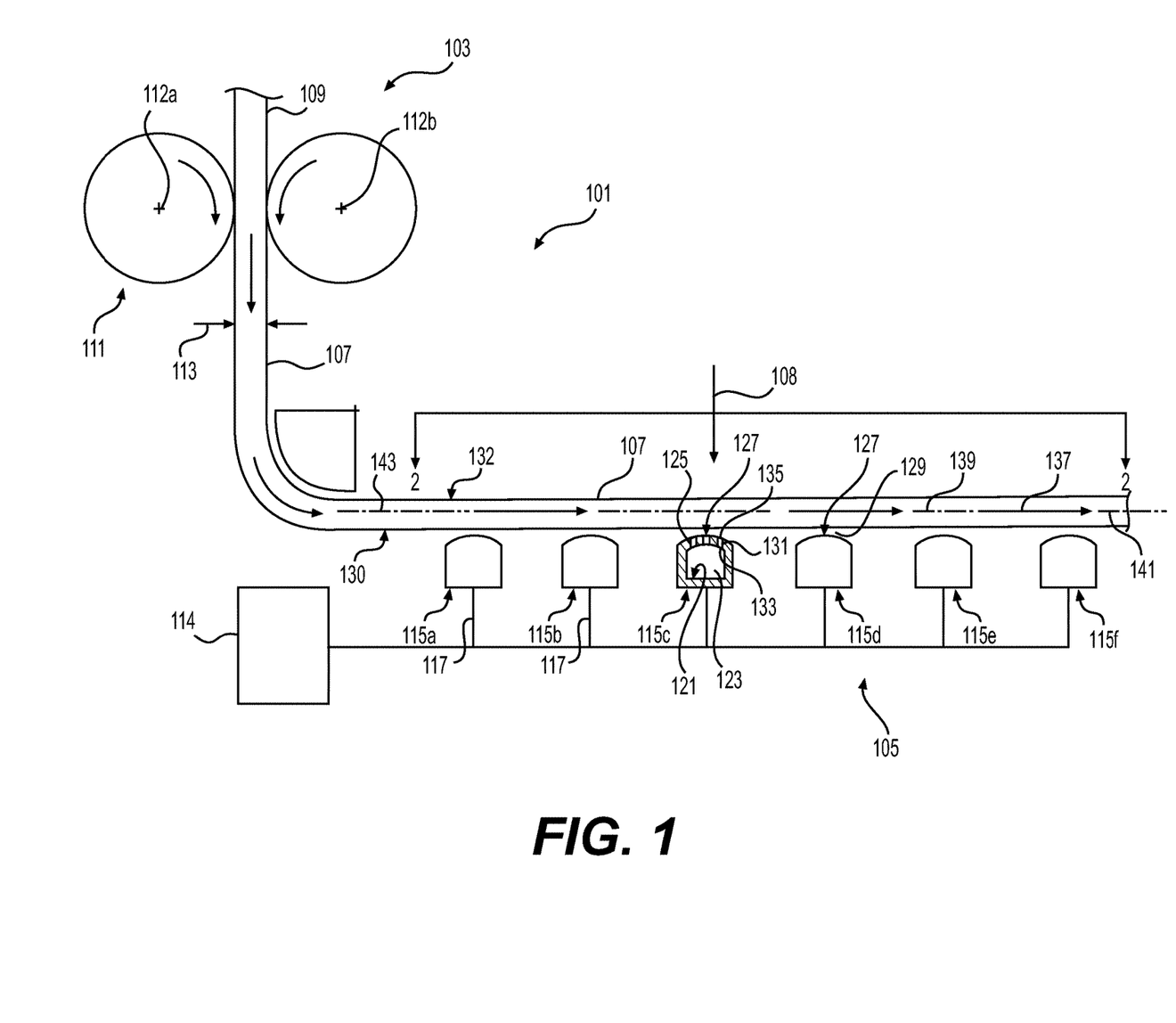
FIG. 1 illustrates an example embodiment of a glass manufacturing apparatus comprising an example embodiment of conveying apparatus in accordance with embodiments of the disclosure.

FIG. 1 schematically illustrates a glass manufacturing apparatus 101 comprising a forming apparatus 103 and a conveying apparatus 105. In the illustrated embodiment, the conveying apparatus 105 can be part of the glass manufacturing apparatus 101 wherein the conveying apparatus may be provided inline with a forming apparatus 103 that forms a ribbon 107 from a quantity of molten material 109. When provided inline as part of the glass manufacturing apparatus 101, the conveying apparatus 105 can be designed to horizontally or diagonally support the ribbon 107 prior to separation after it is formed with the forming apparatus 103. For instance, the ribbon can extend along a direction substantially perpendicular to the direction of gravity 108 such that the ribbon extends horizontally as shown in FIG. 1. Alternatively, the ribbon 107 can extend along a direction that may not be coincident to the direction of gravity 108. In some embodiments, the ribbon can extend at a non-zero angle relative to the direction of gravity 108 such that the ribbon may be supported diagonally or perpendicular relative to the direction of gravity 108. For purposes of this application, the direction of gravity comprises the resultant vector of the direction of gravity 108 as opposed to a vector component of the resultant vector direction of gravity 108.

Although not shown, the conveying apparatus 105 may be provided as a stand-alone apparatus that may not be associated with a forming apparatus. For example, the ribbon 107 can comprise a separated ribbon that can be horizontally or diagonally supported by the conveying apparatus 105 during a subsequent procedure. For instance, previously-formed glass ribbon may be unpackaged from a storage package, unrolled from a roll of glass ribbon or otherwise introduced to the conveying apparatus 105 for a subsequent processing procedure and/or for transporting the glass ribbon from one location to another.

The forming apparatus of the disclosure can comprise an updraw, downdraw (e.g., fusion downdraw), slot draw, or other forming apparatus. By way of illustration, FIG. 1 illustrates the forming apparatus 103 as a press roll apparatus wherein the quantity of molten material 109 can pass through a gap defined between a pair of rotating rolls 111. The rotating rolls 111 forms the ribbon 107 from the quantity of molten material 109 that comprises a thickness 113 corresponding to the gap between the rotating rolls 111. In the illustrated embodiment, the rotation axes 112a, 112b of the corresponding rotating rolls 111 can be parallel relative to one another to provide the ribbon 107 with a substantially constant the thickness 113 across the width 201 (see FIG. 2) of the ribbon 107. In some embodiments, the thickness 113 can be from about 700 microns to about 6 millimeters although other thicknesses may be provided in further embodiments.

In some embodiments, the width 201 of the ribbon 107 can be greater than or equal to about 100 mm, for example greater than or equal to about 500 mm, for example greater than or equal to about 1000 mm, for example greater than or equal to about 2000 mm, for example greater than or equal to about 3000 mm, for example greater than or equal to about 4000 mm, although other widths less than or greater than the widths mentioned above can be provided in further embodiments. For example, in some embodiments, the width 201 of the ribbon 107 can be from about 100 mm to about 4000 mm, for example from about 500 mm to about 4000 mm, for example from about 1000 mm to about 4000 mm, for example from about 2000 mm to about 4000 mm, for example from about 3000 mm to about 4000 mm, for example from about 100 mm to about 3000 mm, for example from about 500 mm to about 3000 mm, for example from about 1000 mm to about 3000 mm, for example from about 2000 mm to about 3000 mm, for example from about 2000 mm to about 2500 mm, and all ranges and subranges therebetween.

Conveying apparatus of the disclosure can comprise one or more support members. For example, as shown in FIG. 1, the conveying apparatus 105 can comprise one or more support members comprising a plurality of support members 115a-f. In the illustrated embodiment, six support members 115a-f are illustrated although more or less than six support members may be provided in further embodiments. As shown, one or more gas supply lines 117 may provide fluid communication between a gas source 119 and the support members 115a-f. The gas source 119 can be designed to provide nitrogen, air or other gas depending on the particular application. Although not shown, in some embodiments, one or more gas manifolds and/or controllers may be designed to regulate the amount of gas supplied to each corresponding support member 115 to allow customized adjustment of the support characteristics of each individual support member 115a-f, all of the support members 115a-f simultaneously, and/or one or more subsets of the support members 115a-f.

As shown schematically by the cross-section of the support member 115c in FIG. 1, any or all of the one or more support members 115a-f can comprise an interior surface 121 defining an interior passage 123 and a plurality of apertures 125 in fluid communication with the interior passage 123 and extending through a support surface 127 of the support member 115a-f. For instance, as shown, an aperture 125 can comprise a single channel 131 comprising a single first opening 133 at the interior surface 121 and a single opposed second opening 135 at the support surface 127. With such a configuration, pressurized gas can pass through the single first opening 133 from the interior passage 123, through the single channel 131, and out the second opening 135 at the support surface 127 to form a gas cushion 129 between the support member and a first major surface 130 of the ribbon 107.

Figure 9:
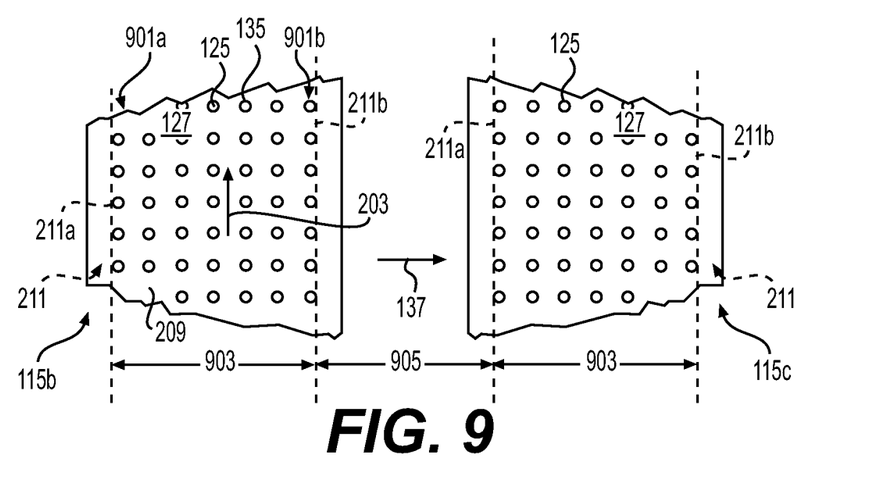
FIG. 9 illustrates an enlarged view of a portion of a pair of adjacent support members taken at view 9 of FIG. 2.

Although not shown, a wide range of alternative aperture configurations may be used in combination or alternatively to the apertures 125 illustrated in the figures. For instance, the apertures 125 can comprise branched apertures with a plurality of openings at the support surface 127 and/or the interior surface. For instance, although not shown, the apertures can be branched such that the apertures begins with a single opening at the interior surface 121 with a single channel branching into a plurality of channels that include a corresponding opening of a plurality of openings at the support surface 127. In further embodiments, as shown, the channel 131 of the aperture 125 can comprise a constant cross-sectional area extending from the first opening 133 at the interior surface 121 to the second opening 135 at the support surface 127. Although not shown, in alternative embodiments, the aperture 125 can comprise cross-sectional areas that are not constant along the length of the channel. For instance, a cross sectional area of the channel can increase (e.g., a stepped increase) or decrease (e.g., a stepped decrease) in a direction from the first opening 133 to the second opening 135. In still further embodiments, an insert may be placed within the channel. In some embodiments, if provided, the insert can include one or more openings and/or can comprise a porous material that can pass pressurized gas through the porous material. As shown in FIG. 9, the second openings 135 can comprise circular orifices although other shapes may be provided in further embodiments. Still further, the openings may comprise a torus channel to provide a ring-shaped fluid stream exiting the opening.

Figure 7:
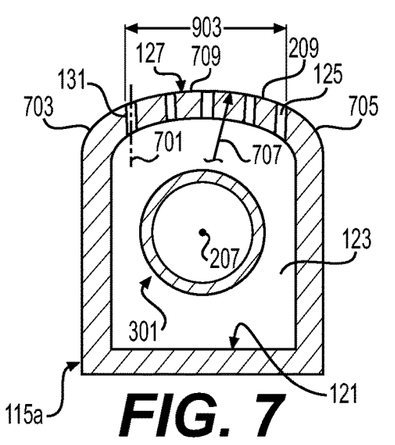
FIG. 7 is a sectional view along line 7-7 in FIGS. 2 and 3 of the corresponding embodiment of the support member illustrated in FIGS. 2 and 3.
Figure 8:
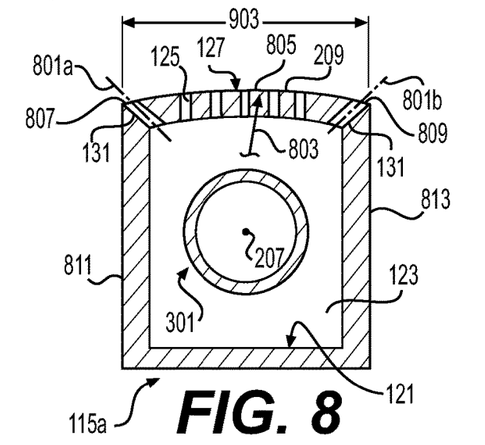
FIG. 8 is a sectional view along line 7-7 in FIGS. 2 and 3 of another corresponding embodiment of the support member illustrated in FIGS. 2 and 3.

The support surface 127 can comprise one or more of a convex surface, flat surface, concave surface and/or other surface configuration. For example, as shown in FIG. 7, a contour 709 of a convex support surface 127 may be defined along a plane perpendicular to an axis 207 extending along a direction 203 of a length 205 of a support area 209 of the support surface 127. As shown in FIG. 7, the contour (e.g., 709) of the support surface 127 of any of the embodiments of the disclosure can extend along a varying radius 707 in the plane perpendicular to the axis. Alternatively, as shown in FIG. 8, a contour 805 of the convex support surface 127 may be defined along a plane perpendicular to the axis 207 of the support area 209 extending along the direction 203 of the length 205 of the support area 209. The contour (e.g., contour 805) of any of the embodiments of the disclosure can extend along a substantially constant radius 803 in the plane perpendicular to the axis 207 such that the contour 805 of the convex surface extends along an arc of a circle. Thus, as shown in FIGS. 7-8, the support area 209 can comprise a convex surface positioned radially about the axis 207 extending along the direction 203 of the length 205 of the support area 209. In some embodiments, the entire support area 209 can comprise a convex surface although portions of the support area may comprise a flat surface and/or a concave surface in further embodiments. As mentioned previously, embodiments of convex surface of the support area 209 can comprise a varying radius 707 (e.g., see FIG. 7) or a constant radius 803 (e.g., FIG. 8). In any of the embodiments of the disclosure, the contour 709, 805 of the convex surface along the plane perpendicular to the axis 207 can extend along a radius 707, 803 in the plane perpendicular to the axis 207 within a range of about 25 millimeters (mm) to about 500 mm although the radius can be less than about 25 mm and/or greater than about 500 mm in further embodiments. Furthermore, in some embodiments, the entire support area 209 may include a convex surface extending along the radius within the range of about 25 mm to about 500 mm although portions of the convex surface may comprise a radius greater than 500 mm and/or portions of the convex surface may be less than 25 mm. For example, the radius of the convex surface may approach infinity as the surface transitions to a flat surface at a central portion of the support area 209. In further embodiments, the radius may be much tighter at a leading end 703 or a trailing end 705 (e.g., 5-10 mm) of the support area 209 to avoid contact of the leading end and/or trailing end in embodiments where the ribbon 107 may be slightly sag between adjacent support members.

Characteristics of the one or more apertures 125 may be designed to accommodate the convex surface or other surface profile of the support area 209 discussed above. As can be shown in FIG. 7, the channel 131 of one or more apertures 125 of the plurality of apertures may extend along an axis that is included in a plane 701 including the direction of the axis 207 and perpendicular to a path direction 137 of a travel path 139 of the ribbon 107. As shown in FIG. 7, the leading end 703 and/or trailing end 705 may be provided with a tighter radius to avoid interference at those locations with the ribbon 107 that may slightly sag as a catenary curve between adjacent support members due to the lack of apertures at the leading end and trailing end. Alternatively, as shown in FIG. 8, the channel 131 of one or more apertures 125 may extend along an axis that is included in a plane 801*a*, 801*b* including the direction of the axis 207 but not perpendicular to the path direction 137 of the travel path 139 of the ribbon 107. For example, as shown in FIG. 8, the plane 801*a* of one or more apertures 125 extending through the leading end 807 may extend at an angle relative to the path direction 137 of the travel path with a directional vector component opposite to the vector direction of the path direction 137 of the travel path 139. As further illustrated, a plane 801*b* of one or more apertures 125 extending through the trailing end 809 may extend at an angle relative to the path direction 137 of the travel path with a directional vector component that may be coincident with the vector direction of the path direction 137 of the travel path 139. As shown in FIG. 8, providing apertures that are not perpendicular and not coincident with the path direction 137 can help provide support even at the leading end 807 and/or trailing end 809 with apertures that may not otherwise be able to communicate with the interior passage 123 due to sidewalls 811, 813 of the support member. In some embodiments, a tight radius may not be needed at the leading end 807 and/or trailing end 809 since the ribbon 107 can be further supported by the gas cushion associated with the apertures 125 at these locations.

Figure 2:
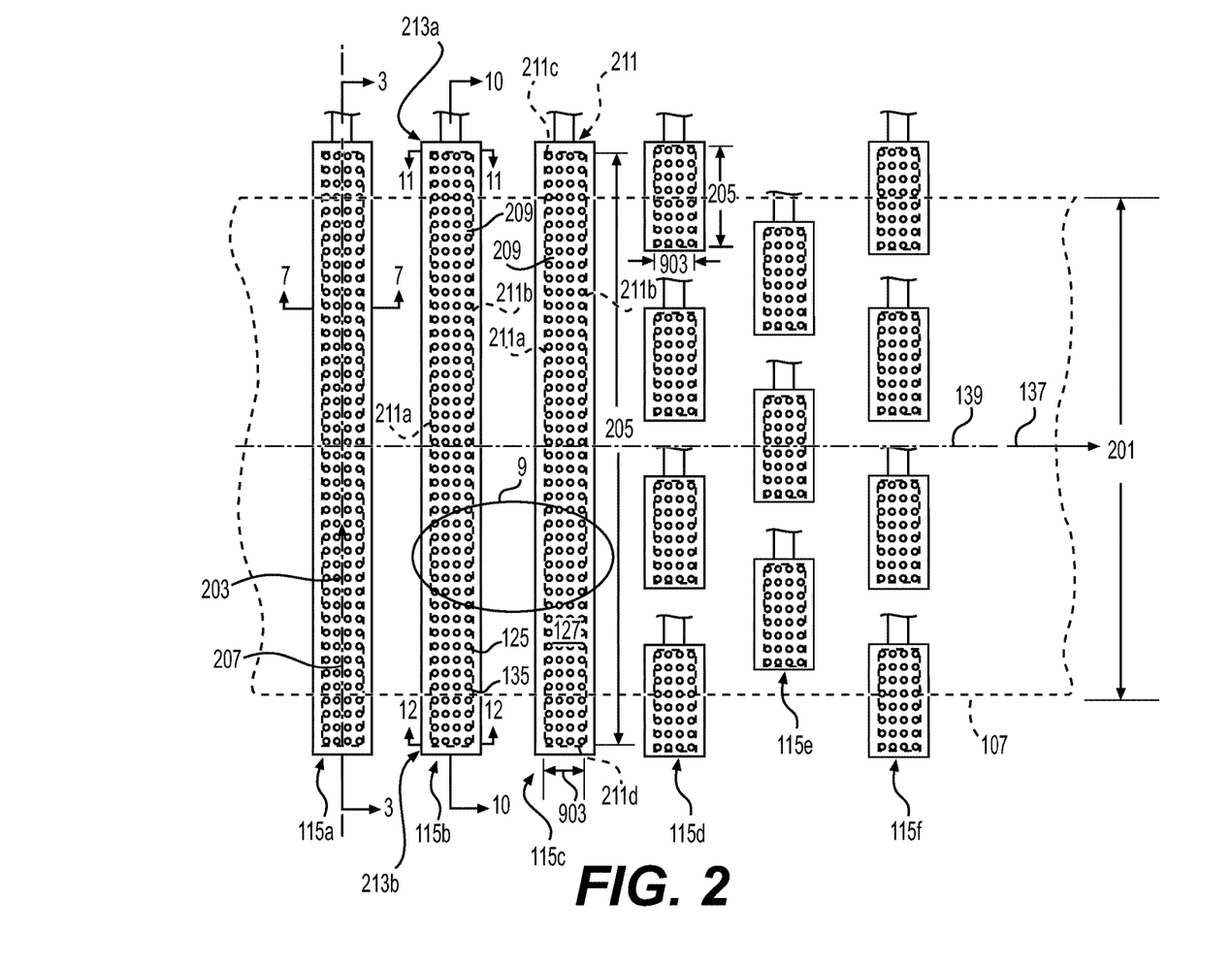
FIG. 2 illustrates a top plan view of the conveying apparatus along line 2-2 of FIG. 1 wherein the ribbon is shown in hidden lines.

As shown in FIG. 2, the second openings 135 at the support surface 127 can define a support area 209 of the support surface 127. The support area 209 is considered, for purposes of this disclosure, as the area bound by an outer periphery 211 of the support area 209 touching the outermost point of the opening of each outer aperture of the plurality of apertures. For instance, as shown in FIG. 9, the outer periphery 211 can comprise linear segments 211*a*, 211*b* touching the outermost tangent point of each second opening 135 of the outermost columns 901*a*, 901*b* of openings of the plurality of openings when the plurality of openings comprises a matrix of openings aligned along rows and columns. Likewise, as shown in FIG. 2, the outer periphery 211 of the support area 209 can be comprise linear segments 211*c*, 211*d* touching the outermost tangent point of each second opening 135 of the outermost rows 213*a*, 213*b*.

The support area can further comprise a width 903 extending in a direction perpendicular to the direction 203 of the length 205 of the support area 209. As shown in FIG. 9, in some embodiments, the width 903 of the support area 209 can extend in the path direction 137 of the travel path 139 of the ribbon 107. The width 903 of the support area 209 in accordance with any of the embodiments of the disclosure can be from about 10 millimeters (mm) to about 100 mm, from about 10 mm to about 50 mm, or from about 10 mm to about 40 mm. In further embodiments, the width 903 can be less than about 10 mm or greater than about 100 mm.

As shown schematically in FIG. 2, the length 205 of the support area 209 of some embodiments of the disclosure can be greater than the width 903 of the support area 209. As shown by the support members 115*a-c*, any or all of the support members may include a length 205 of the support area 209 that is greater than or equal to the width 201 of the ribbon 107. Providing a length 205 that is greater than or equal to the width 201 of the ribbon 107 can provide uniform support pressure by the gas cushion across the width of the ribbon 107, thereby avoiding undesired bowing of the ribbon along the width of the ribbon 107. In alternative embodiments, as shown by the support members 115*d-f*, any or all of the support members may include a length 205 of the support area 209 of the support members that is less than the width 201 of the support member. For instance, at corresponding locations along the travel path 139, a plurality of support members may be spaced apart along the width 201 of the ribbon 107. In some embodiments, the plurality of support members may be spaced close enough together to avoid substantial bowing due to unsupported areas along the width of the ribbon. Still further, in some embodiments, as shown, adjacent sets of support members spaced along locations of the travel path can be staggered relative to one another. For example, the set of support members 115*e* can be staggered along the width of the ribbon 107 relative to the set of support members 115*d*. Similarly, the set of support members 115*f* may be staggered along the width of the ribbon 107 relative to the set of support members 115*3*. Staggering the sets of adjacent support members can provide enhanced effective support across the width 201 of the ribbon 107 to further avoid bowing of the ribbon 107 across the width 201 of the ribbon 107.

The support members of the disclosure can comprise corresponding pairs of support members. For instance, FIG. 2 illustrates many pairs of adjacent support members (e.g., 115*a-b*, 115*b-c*, 115*c-d*, 115*d-e*, 115*e-f*). For purposes of discussion, FIG. 9 illustrates an enlarged view of portions of the pair of adjacent support members 115*b-c* shown in FIG. 8. The pair of adjacent support members 115*b-c* comprises a first support member 115*b* and a second support member 115*c*. The support area 209 of the first support member 115*b* can be spaced from the support area 209 of the second support member 115*c* by a minimum distance 905 of about 50 millimeters (mm) to about 500 mm. In some or all of the embodiments of the disclosure, the minimum distance can be less than about 50 mm or greater than about 500 mm. For purposes of this application, a minimum distance between adjacent support members means the shortest distance between the periphery of the support area of the first support member from the periphery of the support area of the second support member. For instance, with reference to FIG. 9, the linear segment 211*b* of the outer periphery 211 of the support area 209 of the first support member 115*b* may be parallel to the linear segment 211*a* of the outer periphery 211 of the support area 209 of the second support member 115*b*. The minimum distance 905 comprises the distance between the parallel linear segments of the corresponding outer periphery 211 of the support area of the first support member 115*b* and the support area of the second support member 115*c*. In some embodiments, providing a minimum distance 905 of about 50 mm to about 500 mm can provide a minimum distance of about 50 mm that can avoid bulging of the ribbon 107 to facilitate maintenance of the flat surface of the major surfaces of the ribbon during cooling. Indeed, a minimum distance of about 50 mm can allow escape of gas cycling through the gas cushion 129 to prevent accumulation of gas that may undesirably result in bulging of the ribbon. At the same time, maintaining the minimum distance within 500 mm can also avoid undesirable sagging of the ribbon 107 between the support members that may otherwise interfere with maintenance of the flat surface of the major surfaces of the ribbon during cooling.

As shown in FIG. 2, the direction 203 of the length 205 can extend substantially perpendicular to the path direction 137 of the travel path 139 of the ribbon. Providing the length 205 in the direction 203 substantially perpendicular to the path direction 137 can minimize the length of support for preventing bowing of the ribbon in the direction of the width 201 of the ribbon 107. Furthermore, providing the direction 203 of the length 205 to extend substantially perpendicular to the path direction 137 of the travel path 139 of the ribbon 107 can help avoid any tension imbalance across the width 201 of the ribbon 107 that may otherwise occur by positioning the length of the support area at other angles relative to the path direction.

Figure 3:
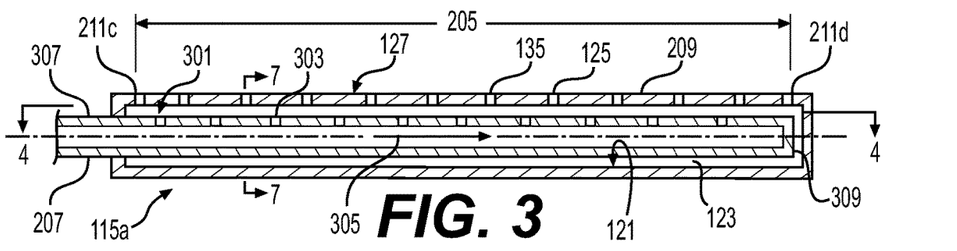
FIG. 3 illustrates a sectional view of an example embodiment of a support member along line 3-3 of FIG. 2.

The support member 115*a* of FIGS. 1-8 comprises support members in accordance with exemplary embodiments of the disclosure. The configurations of the support member 115*a* shown in FIGS. 3-8 can also be incorporated in any one or all of the support members 115*b-f*. FIG. 3 illustrates a cross-sectional view of the support member 115*a* along line 3-3 of FIG. 2 along a plane extending along the axis 207 of the support member 115*a* in the direction 203 of the length 205 of the support member 115*a*. As shown in FIG. 3, the support member 115*a* comprises the interior surface 121 defining the interior passage 123 and a first plurality of apertures 125 in fluid communication with the interior passage 123 and extending through the support surface 127 of the support member 115*a*. The second openings 135 of the first plurality of apertures 125 at the support surface 127 define the support area 209 of the support surface 127. The support area 209 can comprise the length 205. The direction 203 of the length can extend along the flow path of the interior passage 123. The flow path of any of the embodiments of the disclosure can comprise the axis 207 of the support member. The support area 209 further comprises the width 903 that extends in the direction perpendicular to the direction 203 of the length 205, wherein the length 205 can be greater than the width 903.

As shown in FIG. 3, the support member 115*a* can comprise a tube 301 extending within the interior passage 123. The tube 301 can comprise a second plurality of apertures 303 spaced along a flow direction 305 of a flow path of the tube 301. In some embodiments, as shown, the flow path can comprise the axis 207 of the support member 115*a*. Furthermore, in some embodiments, the flow direction 305 of the flow path of the tube 301 can comprise the direction 203 of the length of the support area 209 in some embodiments.

The support member 115*a* can comprise an inlet port 307 that may comprise a portion of the tube 301 upstream from the first aperture of the second plurality of apertures 303 encountered along the flow direction 305. In further embodiments, the inlet port 307 may comprise a coupling or other feature other than the tube 301 that may be connected to the tube 301. As shown in FIG. 3, the support member 115*a* may include a single inlet port 307. In some embodiments, the tube 301 can comprise a first end comprising an inlet end comprising the inlet port 307 and a capped end 309 at the opposite end of the tube. In the illustrated embodiment, a single inlet port 307 may be provided. Although not shown, further embodiments may include multiple inlet ports. For example, the capped end 309 may comprise a second inlet port in further embodiments and/or an intermediate inlet port may be provided at a location between the inlet end and the opposite end of the tube.

Figure 4:
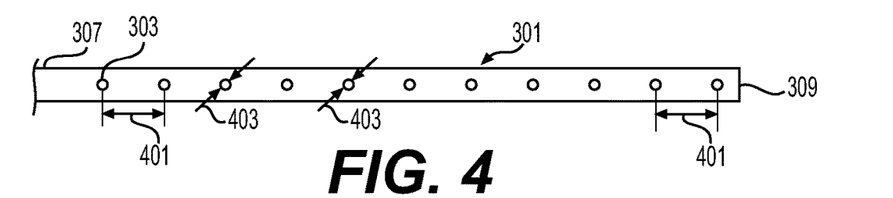
FIG. 4 illustrates an example embodiment of a tube of the support member of FIG. 3 viewed along line 4-4 of FIG. 3.
Figure 5:
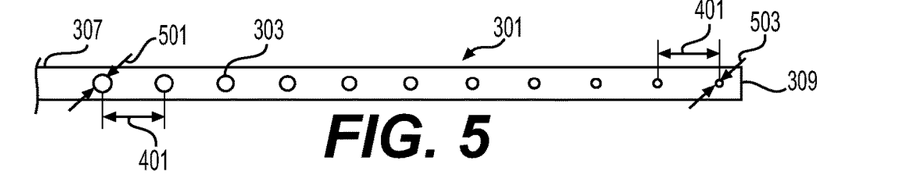
FIG. 5 illustrates another example embodiment of a tube of the support member of FIG. 3 viewed along line 4-4 of FIG. 3.
Figure 6:
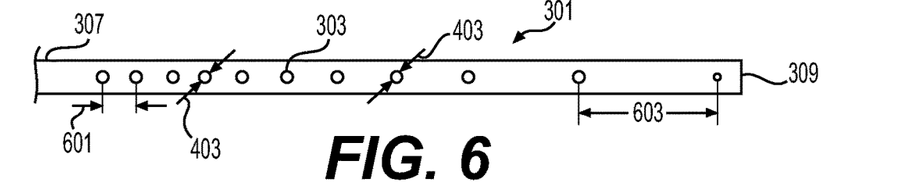
FIG. 6 illustrates still another example embodiment of a tube of the support member of FIG. 3 viewed along line 4-4 of FIG. 3.

As shown in FIGS. 4-5, the tube 301 of any of the embodiments of the disclosure may provide the second plurality of apertures 303 as adjacent pairs of apertures that are equally spaced from one another by a common distance 401. Alternatively, any of the embodiments of the disclosure may provide the plurality of apertures with two pairs of adjacent apertures spaced by a different distance from one another. For instance, as shown in FIG. 6, the plurality of apertures include a pair of adjacent apertures 303 spaced a first distance 601 from one another and another pair of adjacent apertures 303 spaced a second distance 603 from one another. As shown in FIG. 6, the spacing between adjacent apertures of the second plurality of apertures sequentially increase along the flow direction 305 of the flow path of the tube 301 from the first distance 601 to the second distance 603 that is greater than the first distance 601.

In some embodiments, a maximum dimension of apertures of the second plurality of apertures 303 can be substantially the same. For instance, with reference to FIGS. 4 and 6, the maximum dimension comprises a diameter 403 of the apertures 303 that are all substantially the same diameter. Alternatively, a maximum dimension of one aperture may be different than a maximum dimension of another aperture of the second plurality of apertures 303. For instance, as shown in FIG. 5, a diameter 501 of an upstream aperture may be different than (e.g., greater than) a diameter 503 of a downstream aperture. In some embodiments, as shown in FIG. 5, the maximum dimension (e.g., diameter) of the second plurality of apertures 303 sequentially decrease along the flow direction 305 of the flow path of the tube 301 from an upstream aperture 125 including the diameter 501 to the downstream aperture 125 including the diameter 503 that is less than the diameter 501 of the upstream aperture 125.

Figure 10:
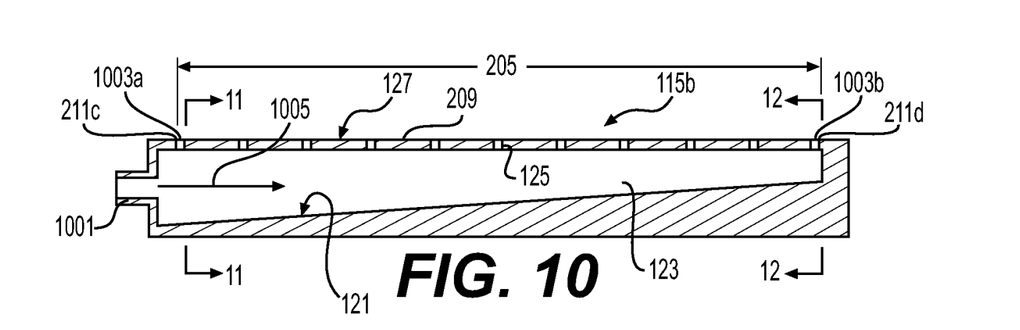
FIG. 10 illustrates a sectional view of another example embodiment of a support member along line 10-10 of FIG. 2.
Figure 11:
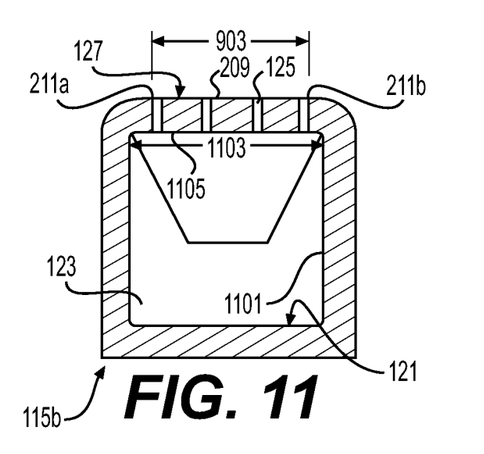
FIG. 11 is a sectional view of the support member of FIG. 10 along line 11-11 of FIGS. 2 and 10.
Figure 12:
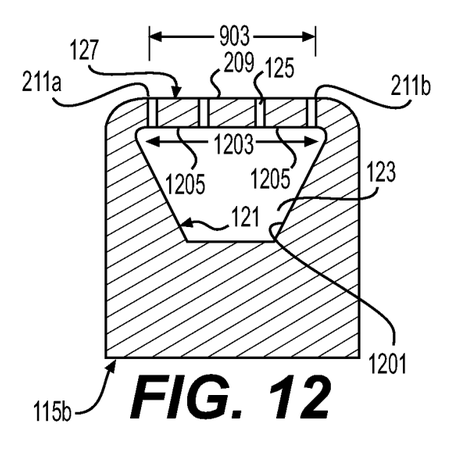
FIG. 12 is a sectional view of the support member of FIG. 10 along line 12-12 of FIGS. 2 and 10.

The support member 115b of FIGS. 1, 2 and 10-12 comprises support members in accordance with exemplary embodiments of the disclosure. The configurations of the support member 115b shown in FIGS. 10-12 can also be incorporated in any one or all of the support members 115a and 115c-f. FIG. 10 illustrates a cross-sectional view of the support member 115b along line 10-10 of FIG. 2 along a plane extending along the axis 207 of the support member 115b in the direction 203 of the length 205 of the support member 115a. FIG. 11 shows a first cross-sectional area of the interior passage 123 along line 11-11 of FIG. 10 that comprises a first plane perpendicular to the direction 203 of the length 205 at a first end portion 1003a of the support area 209 closest to the inlet port 1001. As the direction of the section line 11-11 of FIG. 10 points towards the opposite end of the interior passage 123, the rectangular contour of the interior surface 121 at line 11-11 as well as the projected trapezoidal contour of the interior surface 121 at line 12-12 are shown in the same figure (i.e., FIG. 11). FIG. 12 shows a second cross-sectional area of the interior passage 123 along line 12-12 of FIG. 12 that comprises a second plane perpendicular to the direction 203 of the length 205 at a second end portion 1003b of the support area 209 farthest from the inlet port 1001. As shown, the first cross-sectional area of the interior passage 123 shown in FIG. 11 can be greater than the second cross-sectional area of the interior passage 123 shown in FIG. 12. Furthermore, in some embodiments, the cross-sectional areas of the interior passage 123 along corresponding planes perpendicular to the direction 203 of the length 205 sequentially decrease along the direction 203 of the length 205 from the first cross-sectional area (shown in FIG. 11) to the second cross-sectional area (shown in FIG. 12). In some embodiments, as will be appreciated by FIG. 10, the cross-sectional areas of the interior passage 123 along planes perpendicular to the direction 203 of the length 205 can sequentially decrease at a constant rate along the direction 203 of the length 205 from the first cross-sectional area (shown in FIG. 11) to the second cross-sectional area (shown in FIG. 12).

FIG. 11 illustrates a first contour 1101 of the interior surface 121 circumscribing the first cross-sectional area while FIG. 12 illustrates a second contour 1201 of the interior surface 121 circumscribing the second-cross-sectional area. In some embodiments, the first contour may be geometrically similar to the second contour. For instance, the first contour and second contour may each comprise a square or other common polygonal shape of different sizes. In some embodiments, the first contour 1101 of the interior surface 121 may geometrically different than similar to the second contour 1201 of the interior surface 121 circumscribing the second-cross-sectional area. Providing the first contour and second contour that are geometrically different can facilitate communication of the apertures 125 with the interior passage 123 in some embodiments. For instance, as shown in FIGS. 11 and 12, a width of an upper segment of the interior surface 121 can be substantially the same along the length 205 of the support area. For example, as shown in FIG. 11, a width 1103 of a segment 1105 of the first contour 1101 (e.g., a side of the illustrated rectangle) can be substantially the same as a width 1203 of a segment 1205 of the second contour 1201 (e.g., the longer base of the illustrated isosceles trapezoid) along the upper segment of the interior surface 121 in communication with the apertures 125. Providing the upper segment of the interior surface 121 with substantially the same width along the length 205 of the support area 209 with the width 1103 of the segment 1105 of the first contour 1101 being substantially the same as the width 1203 of the segment 1205 of the second contour 1201 can facilitate communication of the apertures 125 with the interior passage 123 along the length 205 of the support area 209.

In some embodiments, the first contour 1101 can comprise a first trapezoidal shape and the second contour 1201 can comprise a second trapezoidal shape. For instance, as shown in FIG. 11, the first trapezoidal shape of the first contour 1101 can comprise a parallelogram (e.g., rectangle) and, as shown in FIG. 12, the second trapezoidal shape of the second contour 1201 can comprise an acute trapezoid (e.g., isosceles trapezoid) although other trapezoidal shapes can be provided for the first contour 1101 and/or the second contour 1201. For example, in some embodiments, the first trapezoidal shape can comprise a first isosceles trapezoid with a common angle between the sides and a longer base and the second trapezoidal shape can comprise a second isosceles trapezoid with a common angle between the sides and the longer base that is less than the common angle between the sides and the longer base of the first isosceles trapezoid. As shown in FIG. 12, the longer base of the isosceles trapezoid can comprise the upper segment of the interior surface 121 in communication with the apertures 125 to provide communication between the apertures and the interior passage 123.

As demonstrated by FIGS. 11-12, the support area 209 of any of the embodiments of the disclosure can comprise a portion that may be substantially flat. Alternatively, the support area 209 and apertures 125 of the support member 115b can comprise any of the configurations discussed above, for example, with respect to FIGS. 7-8 discussed above.

Methods will now be described of conveying a ribbon of material comprising a viscosity within a range of about $1\times10^6$ poise to about $1\times10^{10}$ poise with the conveying apparatus 105 of any of the embodiments discussed above. With reference to FIG. 1, the methods can optionally comprise a forming apparatus 103 that produces a ribbon 107 of material. The methods can include moving the ribbon 107 of material comprising the viscosity within the range of about $1\times10^6$ poise to about $1\times10^{10}$ poise along the travel path 139 in the path direction 137 that may not be coincident with the direction of gravity 108 and extends across the direction 203 of the length 205 of each support area 209 of the one or more support members 115a-f. The methods can further include passing gas through the plurality of apertures 125 from the interior passage 123 of the one or more support members 115a-f to provide a corresponding gas cushion 129 between the moving ribbon 107 of material and each support area 209 of the one or more support members 115a-f. In any of the embodiments of the disclosure, the gas cushions 129 can space the first major surface 130 of the ribbon 107 from the support area 209 by a minimum gap of from about 100 microns to about 1 mm although other gaps of less than about 100 microns or greater than 1 mm may be provided in further embodiments. In some embodiments, the gas cushions can prevent contact between the ribbon 107 and the support areas 209 as the ribbon 107 travels relative to the support area 209 and as the support areas 209 support a weight of the ribbon 107.

In some embodiments, the gas can be uniformly supplied through the apertures 125 such that the volumetric flow rate may be approximately the same at all locations along the first major surface 130 of the ribbon 107 facing the support area 209. For instance, the volumetric flow rate of gas through the apertures 125 per unit length of the support area 209 can be substantially the same along the length 205 of the support area 209 to provide substantially the same pressure along the width 201 of the ribbon 107 to thereby help maintain the first major surface 130 and second major surface 132 substantially flat during conveyance and cooling of the ribbon 107.

In some embodiments, the conveying apparatus 105 including the gas cushions 129 of the one or more support members 115a-f can reduce the temperature of the moving ribbon 107 of material by a total temperature reduction within a range of about 100° C. to about 150° C. As such, referring to FIG. 1, a temperature of the ribbon 107 at a location 141 exiting the conveying apparatus 105 can be from about 100° C. to about 150° C. less than a location 143 of the ribbon 107 entering the conveying apparatus 105. Consequently, the combined effect of the conveying apparatus 105 including the gas cushions 129 can cool the ribbon faster across the conveying apparatus 105 than applications that do not use gas cushions to support the ribbon 107 while conveying the ribbon. Faster cooling of the ribbon 107 can accommodate faster production of ribbon 107 and can reduce the floor space of a larger conveying apparatus that may otherwise be employed to cool the ribbon without the gas cushions.

Still further, the gas cushions and arrangement and features of the support members can allow the major surface (first major surface 130, second major surface 132) of the moving ribbon 107 of material supported by the one or more support members 115a-f to comprise a flatness of 100 micrometers (microns) or less. For instance, the flatness can be from greater than 0 to about 100 microns. Such flatness can be achieved with a wide range of ribbon dimensions, for example a portion of the ribbon with one of a length or width having a dimension of about 155 millimeters (mm) and the other of the length or width comprising a dimension of about 75 mm although other sizes can be provided in further embodiments. In further embodiments, a sample of the ribbon can be within a sample size with a length or width comprising a dimension of about 300 mm and the other of the length or width comprising a dimension of about 700 mm. In some embodiments, a flatness of greater than 100 microns may be provided in further embodiments, for example embodiments comprising a larger dimension of 300 mm×700 mm discussed above. A flatness of the major surface of the ribbon can be measured by a coordinate measuring machine (CMM).

In some embodiments, the path direction 137 of the travel path 139 of the ribbon 107 can extend substantially perpendicular to the direction 203 of the length 205 of each support area 209 of the one or more support members 115a-f to help prevent bowing of the ribbon across the width. Moreover, tension in the ribbon caused by pulling of the ribbon 107 in the path direction 137 can also prevent bowing of the ribbon 107 in the direction that the ribbon 107 is traveling. In some embodiments, the path direction 137 can be substantially perpendicular to the direction of gravity 108 to further facilitate maintenance of a substantially flat surface of the major surface of the ribbon. Maintaining the substantially flat surface of the ribbon as the ribbon cools can help prevent undesired stress characteristics from being frozen into the cooled glass ribbon.

Furthermore, the width 903 of the support area 209 of the one or more support members 115a-f can be from about 10 millimeters (mm) to about 100 mm, for example about 10 mm to about 50 mm, for example about 10 mm to about 40 mm. The widths 903 of the support area 209 discussed above can be sufficiently high to sufficiently support the ribbon 107 to prevent bowing across the width of the ribbon while maintaining the ribbon in a substantially flat orientation as the ribbon spans between adjacent pairs of support members. Furthermore, the widths 903 of the support area 209 discussed above can be sufficiently low to allow quick cycling of gas through the gas cushion to enhance heat transfer and prevent accumulation of gas within the gas cushion that may otherwise cause bulging of the ribbon 107 out of a substantially flat orientation.

The one or more support members 115a-f of the methods discussed above can comprise the support surface 127 and the interior surface 121 defining the interior passage 123. The support members 115a-f can further comprise the plurality of apertures 125 in fluid communication with the interior passage 123 and extending through the support surface 127. The openings of the first plurality of apertures 125 at the support surface 127 can define the support area 209 of the support surface 127. As discussed above, the support area 209 can comprise the length 205, wherein the direction 203 of the length 205 extends along the flow path of the interior passage 123. As further discussed above, the support area 209 can further comprise the width 903 extending in the direction perpendicular to the direction 203 of the length 205, wherein the length 205 may be greater than the width 903.

In further embodiments, any of the methods of the disclosure can provide one or more of the support members as the support member 115a discussed above with the tube 301 extending within the interior passage 123 of the support member 115a. The tube 301 can comprise the second plurality of apertures 303 spaced along the flow direction 305 of the flow path of the tube 301. The gas travels along the flow path of the tube 301 from the inlet port 307 and then passes through the second plurality of apertures 303 into the interior passage 123 of the support member 115a. The gas then passes through the first plurality of apertures 125 from the interior passage 123 to form the gas cushion 129 between the support area 209 and the first major surface 130 of the ribbon 107.

Providing the support member 115a with the tube 301 extending within the interior passage 123 can help provide a uniform gas flow rate through the apertures along the length 205 of the support area 209. It was observed that without the tube 301, gas escaping the apertures farthest from the inlet port 1001 flowed at a greater volumetric flow rate than apertures closer to the inlet port 1001. While not being bound by theory, it appears to be a result of the air stream from the inlet port 1001 impacting the end of the interior passage 123 farthest from the inlet port 1001 causing a pressure spike that increased air flow at higher rate through the apertures farthest from the inlet port 1001 compared to the air flow rate though the apertures closes to the inlet port 1001. By providing the tube 301 within the interior passage 123, the air flow rate through the apertures 125 can be substantially constant along the length 205 of the support area 209. Furthermore, in some embodiments, the maximum dimension (e.g. diameter 501, 503) of the second plurality of apertures 303 can sequentially decrease along the flow direction 305 of the flow path of the tube 301 as shown in FIG. 5. Such sequential decreasing of the dimension of the apertures can further increase flow rate through the apertures 303 of the tube 301 closest to the inlet port 307 relative to the flow rate through the apertures 303 of the tube 301 farthest to the inlet port to further facilitate a substantially constant air flow rate through the apertures 125 along the length 205 of the support area 209. Still further, in some embodiments, the distance 601,603 between adjacent apertures of the second plurality of apertures 303 can sequentially increase along the flow direction 305 of the flow path of the tube 301. Such sequential increasing of spacing between adjacent apertures can further increase the flow rate through the apertures of a segment of the tube closer to the inlet port 307 relative to the flow rate through the apertures 303 through a segment of the tube farthest from the inlet port 307 to further facilitate a substantially constant air flow rate through the apertures 125 along the length 205 of the support area 209.

In further embodiments, any of the methods of the disclosure can provide one or more of the support members as the support member 115b discussed above with respect to FIGS. 10-12. In some embodiments, as discussed above, the first cross-sectional area (see FIG. 11) of the interior passage 123 along the first plane perpendicular to the direction 203 of the length 205 at the upstream location of the flow path may be greater than the second cross-sectional area (see FIG. 12) of the interior passage along the second plane perpendicular to the direction 203 of the length 205 at the downstream location of the flow path. As discussed above, the cross-sectional areas of the interior passage 123 along corresponding planes perpendicular to the direction 203 of the length 205 can sequentially decrease along the direction of the length 205 from the first cross-sectional area to the second cross-sectional area. In some embodiments, as discussed above, the cross-sectional areas can sequentially decrease at a constant rate. Providing the support member 115b with cross-sectional areas that sequentially decrease (e.g., at a constant rate) can help provide a uniform gas flow rate through the apertures along the length 205 of the support area 209. The above-described issue of gas escaping at a higher flow rate through apertures 125 farthest from the inlet port 1001 can be addressed by increasingly restricting flow through the interior passage 123 along the flow direction 1005 of the gas within the interior passage 123 from the inlet port 1001 toward the opposite closed end of the interior passage 123. Such increased restriction can be achieved by increasingly reducing the cross-sectional area of the passage in the direction 203 from the inlet port 1001 toward the opposite closed end of the interior passage along a section perpendicular to direction 203 of the length 205 of the support area 209. By providing the sequentially reduced cross-sectional area of the interior passage 123 along the direction 203 of the length 205 of the support area 209 from the inlet port 1001, the air flow rate through the apertures 125 can be substantially constant along the length 205 of the support area 209.

As described previously, in some embodiments, the first contour 1101 of the interior surface 121 circumscribing the first cross-sectional area (see FIG. 11) may not be geometrically similar to a second contour 1201 of the interior surface 121 circumscribing the second cross-sectional area (see FIG. 12). For example, a segment 1105 of the first contour 1101 and a segment 1205 of the second contour 1201 can be substantially the same to facilitate fluid communication between the apertures 125 and the interior passage 123. By way of example, the first contour 1101 can comprise a first trapezoidal shape for example the illustrated parallelogram comprising a rectangle. Furthermore, the second contour 1201 can comprise a second trapezoidal shape comprising the illustrated isosceles trapezoid although acute trapezoids or other trapezoidal shape may be provided in further embodiments. As shown, the acute trapezoid (e.g., isosceles trapezoid) comprises the longest base comprising the segment 1205 of the second contour 1201 while a side of the rectangle of the first contour 1101 comprises the segment 1105 of the first contour 1101. As such, the longest base of the acute trapezoid forming the segment 1205 of the second contour 1201 can have a length that is substantially equal to the length of the side of the rectangular forming the segment 1105 of the first contour 1101 to allow communication of the apertures with the interior passage 123 while further providing the second cross-sectional area of FIG. 12 that is less than the first cross-sectional area of FIG. 11.

Alone or in combination with any of the embodiments of the disclosure, methods can be provided with the width 903 of the support area 209 within a range from about 10 millimeters (mm) to about 100 millimeters, from about 10 mm to about 50 mm, or from about 10 mm to about 40 mm to help gas quickly cycle through the gas cushion 129 without undesirable accumulation of gas that may otherwise reduce the heat transfer rate and/or cause bulging of the ribbon 107 out of a flat orientation. Bulging of the ribbon may be avoided in some embodiments to maintain a substantially flat major surface 130, 132 of less than or equal to 100 microns, thereby allowing the ribbon to set in the substantially flat orientation to reduced undesirable characteristics (e.g., stress concentrations, optical discontinuities) that may be frozen into the glass ribbon if a bulge were allowed to exist as the ribbon cools. Furthermore, quickly cycling gas through the gas cushion 129 by use of support members 115a-f comprising the support area 209 with the width 903 of from about 10 mm to about 100 millimeters, from about 10 mm to about 50 mm, or from about 10 mm to about 40 mm can help allow enhanced heat transfer of the ribbon 107 as heated air residing within the gas cushion 129 can be quickly removed from the area between the ribbon 107 and the support area 209 of the support member 115a-f.

In some embodiments, as discussed with respect to FIGS. 7-8 above, the support area 209 can comprise the convex surface positioned radially about the axis 207 extending along the direction 203 of the length 205 of the support area 209. The contour of the convex surface along the plane perpendicular to the axis 207 can extend along the radius 707, 803 in the plane perpendicular to the axis within a range of about 25 mm to about 500 mm. Providing the convex surface with the radius 707, 803 within the range of about 25 mm to about 500 mm can accommodate a slight catenary curve that may exist between adjacent support members; thereby providing substantially the same minimum gap (e.g. selected from about 100 microns to about 1 mm) at all locations across the width 903 and/or the length 205 of the support area 209 to help adequately space the ribbon 107 from touching the underlying support area 209. In addition or alternatively, providing the convex surface with the radius 707, 803 within the range of about 25 mm to about 500 mm can accommodate a slight catenary curve that may exist between adjacent support members to provide a substantially equal pressure applied by the gas cushion at all locations across the width 903 and/or length 205 of the support area 209. The substantially constant pressure can avoid formation of stress concentrations or other imperfections in the ribbon 107 as it cools to a glass ribbon. In some embodiments, the radius can be adjusted to match the viscosity of the ribbon 107 of material, weight of the ribbon 107 of material spanning between an adjacent pair of support members, and the spacing between the support areas of adjacent support members. As viscosity of the ribbon 107 of material goes up, the support members can be spaced further apart and the radius may comprise a wide range of radius that may not significantly affect the flatness of the major surfaces 130, 132 of the ribbon 107. In further embodiments, as the viscosity of the ribbon 107 goes down, the support member may be spaced closer together and a higher radius may help maintain the flatness of the major surfaces 130, 132 of the ribbon 107.

Furthermore, as discussed with respect to FIG. 9 above, a minimum distance 905 between the support area of a first support member and the support area of a second support member of a pair of adjacent support members can be from about 50 mm to about 500 mm. The minimum distance 905 between the support areas can be adjusted to avoid being too large in a particular application that may otherwise result in a significant catenary curve in the major surfaces of the ribbon 107 due to sagging between adjacent support members. Rather, the minimum distance 905 can be small enough to facilitate maintenance of a substantially flat surface (e.g., 100 micrometers or less) of the major surfaces 130, 132 of the ribbon 107. Furthermore, the minimum distance 905 can also be large enough to facilitate quick cycling of gas through the gas cushion 129 to allow enhanced heat transfer (and associated rate of cooling) while also preventing bulging of the ribbon that may otherwise occur if the distance between the support members are too small. If the distance between the support members are too small, the support members may effectively act as a support table comprising the combined width of all of the support members, thereby causing bulging of the ribbon 107.

Any of the methods of the disclosure can support the ribbon such that a major surface of the moving ribbon 107 of material supported by the one or more support members 115a-f comprises a flatness of 100 microns or less, or from greater than 0 microns to less than or equal to 100 microns. Supporting the ribbon 107 with a flatness of 100 microns or less can allow the ribbon to transition from a viscous or viscoelastic state to an elastic state with reduced undesirable characteristics (e.g., stress concentrations, optical discontinuities) that may be frozen into the glass ribbon if the glass were to cool from the viscous or viscoelastic state to the transition state without a flatness of 100 microns or less. For purposes of this disclosure, the viscous or viscoelastic state of a material of a ribbon 107 to be cooled into a glass ribbon has a viscosity within a range of about $1\times10^6$ poise to about $1\times10^{10}$ poise.

In any of the methods of the disclosure, the gas cushions of the one or more support members can collectively reduce the temperature of the moving ribbon of material to facilitate a faster cooling of the ribbon in conditions where the ribbon may achieve a target temperature before being introduced to a downstream process. For instance, at a certain volumetric rate, a ribbon not supported by gas cushions may achieve a sufficient cooling rate without the aid of the gas cushions. In some embodiments, for instance, when a ribbon has a lower viscosity or travels at a faster rate, cooling with gas cushions that also support a weight of the ribbon can reduce the temperature and consequently increase the viscosity to a predetermined level prior to being introduced into the downstream process.

The cooling rate provided by the gas cushions can be dependent on the rate of convective heat transfer of heat from the ribbon to the cushion of gas. Furthermore, the cooling rate can also be influenced by radiative heat transfer of heat radiating from the ribbon to the one or more support member which can also be cooled by the air flowing through the apertures 125. Fine tune adjusting of the cooling rate can be achieved, for example, by adjusting the fluid flow rate of fluid passing through the apertures 125 that feed the gas cushion. In further embodiments, the gas can be heated or cooled prior to passing through the apertures 125 to further adjust the cooling rate. Still further, adjustment of the width of the support area can impact the rate of temperature adjustment. For instance, providing the width of the support area within a range of from about 10 millimeters (mm) to about 100 millimeters, from about 10 mm to about 50 mm, or from about 10 mm to about 40 mm can help reduce the residence time of the gas within the gas cushion by allowing the gas to quickly escape from the area between the support member and the ribbon before achieving an elevated temperature that may not be as effective at convective heat transfer.

In some embodiments, the conveying apparatus 105 including the gas cushions 129 can provide a temperature reduction of the ribbon 107 by a total temperature reduction within a range of about 100° C. to about 150° C. although other total temperature reductions may be provided in further embodiments. In further embodiments, the support ribbon may have a temperature of about 500° C. to about 1200° C. and may cool with the conveying apparatus including the gas cushions (e.g., the collective cooling with the one or more support members 115a-f) by total temperature reduction within a range of about 100° C. to about 150° C. It will be appreciated that the viscosity of the ribbon at a particular temperature can be dependent on the particular glass composition. In some embodiments, the cooled glass ribbon can comprise soda lime glass, borosilicate glass, aluminoborosilicate glass, alumino silicate glass, alkaline alumino silicate glass, glass ceramic or other types of glass.

It should be understood that while various embodiments have been described in detail with respect to certain illus- What it claimed is:

1. A conveying apparatus comprising:
one or more support members comprising an interior surface defining an interior passage and a first plurality of apertures in fluid communication with the interior passage and extending through a support surface of the support member, openings of the first plurality of apertures at the support surface define a support area of the support surface, the support area comprises a length, a direction of the length extends along a flow path of the interior passage, and the support area further comprises a width extending in a direction perpendicular to the direction of the length, the length is greater than the width; and
a tube extending within the interior passage of the one or more support members, the tube comprising a second plurality of apertures spaced along a flow direction of a flow path of the tube, wherein a spacing between adjacent apertures of the second plurality of apertures sequentially increase along the flow direction of the flow path of the tube.

2. The conveying apparatus of claim 1, wherein the support area comprises a convex surface positioned radially about an axis extending along the direction of the length of the support area, and a contour of the convex surface along a plane perpendicular to the axis extends along a radius in the plane perpendicular to the axis.

3. A conveying apparatus comprising:
one or more support members comprising an interior surface defining an interior passage and a plurality of apertures in fluid communication with the interior passage and extending through a support surface of the support member, openings of the plurality of apertures at the support surface define a support area of the support surface, the support area comprises a length, a direction of the length extends along a flow path of the interior passage, and the support area further comprises a width extending in a direction perpendicular to the direction of the length, the width of the support area is from about 10 millimeters to about 100 millimeters, the length is greater than the width, the support area comprises a convex surface positioned radially about an axis extending along the direction of the length of the support area, and a contour of the convex surface along a plane perpendicular to the axis extends along a radius in the plane perpendicular to the axis within a range of about 25 millimeters to about 500 millimeters.

4. A method of conveying a ribbon of material comprising a viscosity within a range of about $1\times10^6$ poise to about $1\times10^{10}$ poise with the conveying apparatus of claim 1, the method comprising:
moving the ribbon of material comprising the viscosity within the range of about $1\times10^6$ poise to about $1\times10^{10}$ poise along a travel path in a path direction that is not coincident with the direction of gravity and extends across the direction of the length of each support area of the one or more support members; and
passing gas through the plurality of apertures from the interior passage of the one or more support members to provide a corresponding gas cushion between the moving ribbon of material and each support area of the one or more support members.

5. The method of claim 4, wherein the conveying apparatus reduces the temperature of the moving ribbon of material by a total temperature reduction within a range of about 100° C. to about 150° C.

6. The method of claim 4, wherein a major surface of the moving ribbon of material supported by the one or more support members comprises a flatness of 100 microns or less.

7. The method of claim 4, wherein the path direction extends substantially perpendicular to the direction of the length of each support area of the one or more support members.

8. The method of claim 4, wherein the path direction is substantially perpendicular to the direction of gravity.

9. A method of conveying a ribbon of material comprising a viscosity within a range of about $1\times10^6$ poise to about $1\times10^{10}$ poise with one or more support members, wherein each support member of the one or more support members comprises a support surface and an interior surface defining an interior passage and a first plurality of apertures in fluid communication with the interior passage and extending through the support surface, openings of the first plurality of apertures at the support surface define a support area of the support surface, the support area comprises a length, a direction of the length extends along a flow path of the interior passage, and the support area further comprises a width extending in a direction perpendicular to the direction of the length, the length is greater than the width, the method comprising:
moving the ribbon of material comprising the viscosity within the range of about $1\times10^6$ poise to about $1\times10^{10}$ poise along a travel path in a path direction that is not coincident with the direction of gravity and extends across the direction of the length of each support area of the one or more support members; and
passing gas through the first plurality of apertures from the interior passage of the one or more support members to provide a gas cushion between the moving ribbon of material and each support area of the one or more support members, and further comprising directing a gas stream along the flow path of the interior passage of the one or more support members, wherein a first cross-sectional area of the interior passage along a first plane perpendicular to the direction of the length at an upstream location of the flow path is greater than a second cross-sectional area of the interior passage along a second plane perpendicular to the direction of the length at a downstream location of the flow path.

10. The method of claim 9, wherein cross-sectional areas of the interior passage along corresponding planes perpendicular to the direction of the length sequentially decrease along the direction of the length from the first cross-sectional area to the second cross-sectional area.

11. The method of claim 9, wherein the one or more support members further comprises a tube extending within the interior passage of the one or more support members, the tube comprising a second plurality of apertures spaced along a flow direction of a flow path of the tube, and the gas travels along the flow path of the tube and then passes through the second plurality of apertures into the interior passage of the one or more support members to then pass through the first plurality of apertures from the interior passage of the one or more support members.

12. The method of claim 9, wherein the support area comprises a convex surface positioned radially about an axis extending along the direction of the length of the support area, and a contour of the convex surface along a plane perpendicular to the axis extends along a radius in the plane perpendicular to the axis.

\* \* \* \* \*